United States Patent
Van Vliet et al.

(10) Patent No.: US 12,258,512 B2
(45) Date of Patent: Mar. 25, 2025

(54) IN-SITU REACTIVE ABSORPTION FOR EQUILIBRIUM-SHIFTING OF NON-CONDENSABLE GASES

(71) Applicant: Nederlandse Organisatie voor toegepast-natuurwetenschappelijk onderzoek TNO, 's-Gravenhage (NL)

(72) Inventors: Laurens Daniël Van Vliet, 's-Gravenhage (NL); Anca Anastasopol, 's-Gravenhage (NL); Pavol Bodis, 's-Gravenhage (NL); Ruud Cuypers, 's-Gravenhage (NL); Hartmut Rudolf Fischer, 's-Gravenhage (NL); Hendrik Pieter Oversloot, 's-Gravenhage (NL); Cornelis Petrus Marcus Roelands, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 47 days.

(21) Appl. No.: 18/203,923

(22) Filed: May 31, 2023

(65) Prior Publication Data

US 2023/0348772 A1    Nov. 2, 2023

Related U.S. Application Data

(62) Division of application No. 16/330,930, filed as application No. PCT/NL2017/050599 on Sep. 12, 2017, now abandoned.

(30) Foreign Application Priority Data

Sep. 12, 2016 (NL) .................................. 16188405.1

(51) Int. Cl.
    *C09K 5/16*      (2006.01)
    *F25D 1/00*      (2006.01)
    *F28D 20/00*      (2006.01)

(52) U.S. Cl.
    CPC .................. *C09K 5/16* (2013.01); *F25D 1/00* (2013.01); *F28D 20/003* (2013.01);
(Continued)

(58) Field of Classification Search
    CPC ..... C09K 5/16; F28D 20/003; F28D 20/0034; F28D 2020/0047; F25D 1/00
    See application file for complete search history.

(56) References Cited

U.S. PATENT DOCUMENTS 1,679,432 A      8/1928    Lyon et al.
2,771,411 A * 11/1956    Chester ..................... C01C 3/10
                                                                     205/306
(Continued)

FOREIGN PATENT DOCUMENTS

DE      102014212051 A1      1/2015
GB      1348386      3/1974
(Continued)

OTHER PUBLICATIONS

Jaume Cot-Gores et al: "Thermochemical energy storage and conversion: A-state-of-the-art review of the experimental research under practical conditions", Renewable and Sustainable Energy Reviews, Elseviers Science, New York, NY, US, vol. 16, No. 7, Apr. 1, 2012 (Apr. 1, 2012), pp. 5207-5224, XP028408351.
(Continued)

*Primary Examiner* — Matthew R Diaz
(74) *Attorney, Agent, or Firm* — Banner & Witcoff, Ltd.

(57) ABSTRACT

The invention is directed to a salt composition for use in a thermochemical energy storage device, said salt composition comprising a base and a hygroscopic salt that can
(Continued)

produce a gas by reacting with an acid. In further aspects the invention is directed to ab energy storage compartment and a thermochemical energy storage device comprising the salt composition.

12 Claims, 1 Drawing Sheet

(52) U.S. Cl.
CPC .. *F28D 20/0034* (2013.01); *F28D 2020/0047* (2013.01); *Y02E 60/14* (2013.01)

(56) References Cited

U.S. PATENT DOCUMENTS

| | | | |
|---|---|---|---|
| 2,795,491 A | | 6/1957 | Newman et al. |
| 2,812,245 A | * | 11/1957 | Haines .................. C01B 17/36 |
| | | | 23/302 R |
| 3,470,865 A | | 10/1969 | Mekjean |
| 4,638,646 A | * | 1/1987 | Koseki .................. F28D 20/003 |
| | | | 62/119 |
| 4,668,489 A | | 5/1987 | Alexander et al. |
| 4,823,864 A | * | 4/1989 | Rockenfeller ........ F28D 20/003 |
| | | | 62/106 |
| 5,440,899 A | * | 8/1995 | De Beijer ............. F28D 20/003 |
| | | | 62/480 |
| 5,576,066 A | | 11/1996 | Polti |
| 7,186,316 B1 | | 3/2007 | Ryu et al. |
| 10,266,679 B2 | * | 4/2019 | Cuypers .................. C08K 9/10 |
| 2011/0247606 A1 | | 10/2011 | Major et al. |
| 2011/0271953 A1 | * | 11/2011 | Wortmann .......... F28D 20/0039 |
| | | | 220/721 |
| 2012/0037148 A1 | * | 2/2012 | Tudor .................... F28D 20/02 |
| | | | 126/400 |
| 2015/0344763 A1 | * | 12/2015 | Cuypers .................. C08K 9/10 |
| | | | 252/73 |

FOREIGN PATENT DOCUMENTS

| | | | | |
|---|---|---|---|---|
| JP | 2009186119 A | | 8/2009 | |
| JP | 2014024887 A | | 2/2014 | |
| WO | WO-7901003 A1 | * | 11/1979 | |
| WO | WO-2004007633 A1 | * | 1/2004 | ............... C09K 5/16 |
| WO | 2014104886 A1 | | 7/2014 | |
| WO | 2016036242 A1 | | 3/2016 | |

OTHER PUBLICATIONS

Jan. 18, 2018—International Search Report and Written Opinion—Appl. No. PCT/NL2017/050599.
English language machine translation of Ryu et al. (JP 2009-186119 A). (Year 2009).
English language machine translation of Hayase et al. (JP 2014-024887 A). (Year 2014).
English language machine translation of Bauer (DE 102014212051 A1). (Year 2015).

* cited by examiner

IN-SITU REACTIVE ABSORPTION FOR EQUILIBRIUM-SHIFTING OF NON-CONDENSABLE GASES

CROSS-REFERENCE TO RELATED APPLICATIONS

This application is a divisional of U.S. application Ser. No. 16/330,930, filed Mar. 6, 2019, which is a U.S. National Stage application under 35 U.S.C. § 371 of International Application PCT/NL2017/050599 (published as WO 2018/048307A1), filed Sep. 12, 2017, which claims the benefit of priority to EP 16188405.1, filed Sep. 12, 2016. Benefit of the filing date of each of these prior applications is hereby claimed. Each of these prior applications is hereby incorporated by reference in its entirety.

FIELD OF THE INVENTION

The invention relates to an energy device such as an energy storage device and/or an energy conversion device. The invention relates in particular to a thermochemical heat storage and/or a thermochemical conversion device comprising a hygroscopic salt.

BACKGROUND OF THE INVENTION

Energy devices such as heat conversion and heat storage devices enable the storage and later on delivery of energy in the form of heat. For instance, heat storage devices can store excess of heat during the summer period and release the stored heat during the winter period. Alternatively for cooling purposes, the heat stored in the charging process can be immediately released after the charging is finished in order to create a cooling effect in another part of the system. This is typically the method used in cooling or chiller devices or heat pumps.

Examples of known energy devices include hot water tanks (boiler technology), lithium-ion batteries and thermochemical energy storage devices, chillers and heat pumps. Thermochemical energy storage is particularly advantageous due to its relatively high energy storage density, its relatively low cost price per stored energy quantity and wide range of working temperatures with respect to other energy storage and conversion devices. In addition, the loss of energy during prolonged storage is minimal for thermochemical energy storage devices.

Thermochemical energy devices are typically based on reversible chemical reaction and/or sorption processes. During the charging of the device (i.e. the storing of heat) an endothermic reaction or desorption occurs by consuming heat. During the discharging of the device (i.e. release of heat), the reverse process, an exothermic reaction or sorption occurs and heat is released. Examples of typical chemical reaction and/or sorption processes for thermochemical heat storage are i.a. described in Cot-Gores et al., Renewable and Sustainable Energy Reviews 16 (2012) 5207-5224, which is incorporated herein in its entirety.

SUMMARY OF THE INVENTION

A number of thermochemical heat storage processes are based on the sorption or conversion of water. In these processes, the water is generally absorbed or converted by hygroscopic salts. Hygroscopic salts that are typically employed for this purpose are for instance $Al_2(SO_4)_3$, CaO, $Me_xCl_y$ (wherein Me is a metal, resulting in e.g. $CaCl_2$, $MgCl_2$, $MnCl_2$, and the like), $K_2CO_3$, $MgSO_4$, MgO; $Na_2S$, $SrBr_2$ and the like. The absorption or conversion of water by the hygroscopic salt results in the release of heat. Examples of sorption processes based on hygroscopic salts are for instance:

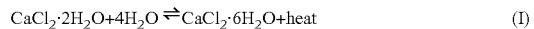
$$CaCl_2 \cdot 2H_2O + 4H_2O \rightleftharpoons CaCl_2 \cdot 6H_2O + \text{heat} \qquad (I)$$

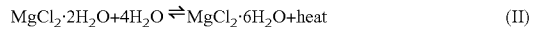
$$MgCl_2 \cdot 2H_2O + 4H_2O \rightleftharpoons MgCl_2 \cdot 6H_2O + \text{heat} \qquad (II)$$

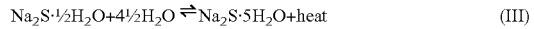
$$Na_2S \cdot \tfrac{1}{2}H_2O + 4\tfrac{1}{2}H_2O \rightleftharpoons Na_2S \cdot 5H_2O + \text{heat} \qquad (III)$$

During charging of the device, water is released by desorption and/or reaction of a wet hygroscopic salt. The released water is removed from the dried hygroscopic salt, generally by condensation, and stored separately. For discharging the device, the dried hygroscopic salt is contacted with the water to (re)produce the wet hygroscopic salt and heat. For an efficient and effective system, it is desired that the storage device can be maximally charged and discharged, i.e. that the each reaction/sorption process on which the device is based can go to maximum completion. However, prior to the present invention was made, heat storages devices gave undesirably low degrees of conversion/desorption (e.g. about 50-60%) such that the device could not satisfyingly be charged with heat energy. Reasons for this undesired low charge capacity may for instance be gas leakage into the system (the system is preferably operated under vacuum), decomposition of the hygroscopic salt, leakage of stored water to the dried hygroscopic salt, outgassing of components in the system, reaction between components in the system that produce non-condensable gasses and the like.

Surprisingly, the present inventors have found another problem associated with the thermochemical energy devices that are based on hygroscopic salts and water. The hygroscopic salts that are typically applied in the storage device may react undesirably with water to produce a gas, typically a non-condensable gas which is a gas that does not condensate under common operational parameters of the thermochemical energy device.

The gas is believed to likely originate from the anion and/or from impurities present in the hygroscopic salt. Depending on the hygroscopic salt that is used, said gas may for instance comprise one or more of HCl, $H_2S$, $H_2SO_4$, etc. Prior to the present invention was made, this undesired side reaction was not believed to be a major drawback, as the amount of the gas produced would be relatively low. A reason for this was conventionally believed to be that a low partial pressure of the gas would result in the reverse reaction; i.e. the reaction of the gas to form back the hygroscopic salt and water. Accordingly, the relative low amount of produced gas and concomitantly consumed hygroscopic salt was assumed not to result in a significant decrease of the overall storage capacity.

However, the present inventors realized the significance of suppressing the reaction of the hygroscopic salt and the water. The present inventors further realized that suppressing this reaction may i.a. be achieved by recrystallization of the hygroscopic salt (to remove impurities in the hygroscopic salt that react with the water and result in the gas) and/or by shifting the equilibrium under which the gas is produced away from the production of said gas. Accordingly, it was surprisingly found that the energy (storage) capacity of the thermochemical energy device can be improved by providing a base in the device, preferably in the salt composition.

DETAILED DESCRIPTION

Figure 1:
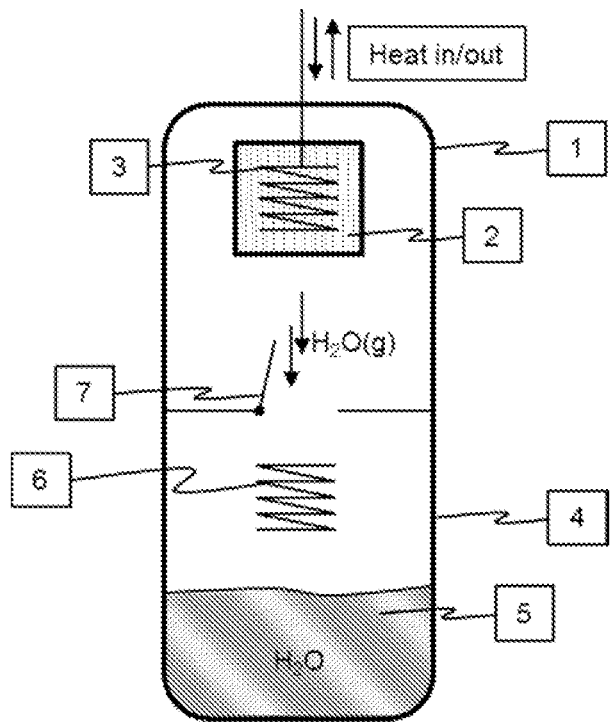
FIG. 1 schematically illustrates a particular embodiment of the thermochemical energy storage device in accordance with the present invention.

The present invention is therefore directed to a salt composition for use in a thermochemical energy storage device, said salt composition comprising a base and a hygroscopic salt that can produce a gas by reacting with an acid. The present invention may be particularly suitable for shifting the reaction equilibrium of non-condensable gas formation, but it may also be beneficial in case the formed gas is condensable. Condensable gas may also be undesired and may for instance result in corrosion of one or more parts of the thermochemical energy device. This may particular be the situation with acidic gasses such as $H_2SO_4$. Preferably the gas comprises non-condensable gas as this formation may particularly be challenging to limit and the present invention is particularly suitable for this purpose.

The presence of the base in the salt composition may also result in the suppression of gas formation that originate from reactions of other reactive components in the thermochemical energy device, e.g. the coating or shielding. In general, it is preferable to suppress all possible reactions in the storage device and the present invention may particularly be suitable to this end.

For instance, when the hygroscopic salt comprises $Na_2S$, the gas $H_2S$ may i.a. be produced in accordance with reaction (V). In a static system, the equilibrium of this reaction (V) will typically be shifted almost entirely to the left ($2Na_2S+H_2O$ side) such that only a negligible amount of $H_2S$ may be present and as such only a small amount of the hygroscopic salt $Na_2S$ may be consumed.

$$2Na_2S+H_2O \rightleftharpoons Na_2S+NaOH+H_2S \quad (V)$$

The present inventors however realized that formation of the gas does typically result in an undesirable loss of overall storage capacity. Without wishing to be bound by theory, the inventors believe that upon charging of the device (i.e. upon release of water from the wet hygroscopic salt), the released water that flows to a water storage compartment to be condensed and stored therein, may carry the gas to the water storage compartment. This may result in at least two undesirable effects. Since the gas is transported away from the hygroscopic salt, the equilibrium of the reaction of the hygroscopic salt with the water producing the gas, shift towards to production of the gas and away from the hygroscopic salt. Thus, more hygroscopic salt may be consumed and more gas may be produced. In addition, the produced gas may accumulate in or near the water storage compartment, in particular near a condenser that is typically present in said compartment. The presence of the gas near or in the condenser, a decreased accessibility of the condenser for the released water, since a layer of the (non-condensable) gas will be in the pathway of the water flow towards the condenser. Overall the performance of the thermochemical heat storage device may be reduced.

The principle underlying the present invention, may be applied to any hygroscopic salt that can produce a gas by reacting with a compound that can donate a proton (i.e. an acid). Examples of such acids include water, methanol and the like. In general, the formation of gas can be illustrated by the following reaction:

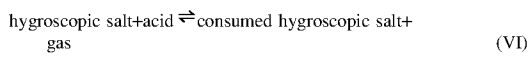
(VI)

Typically, the hygroscopic salt in accordance with the present invention comprises an anion selected from the group consisting of chlorides, sulfides, carbonates, sulfates, sulfites and combinations thereof. Each of these anions are capable of reacting with an acid to produce a gas that may reduce the performance of the thermochemical energy device. For instance, such anions may react with an acid to produce a gas comprising HCl, $H_2S$, $H_2O/CO_2$, $H_3SO_4$ $H_2SO_3$ and the like.

It is to be understood that the gas that may be produced by the reaction of the hygroscopic salt and the acid, is chemically different from the acid. For instance, when the salt composition is applied in a thermochemical storage device based on water, the gas does not comprise water.

In a particular embodiment, the hygroscopic salt comprises a metal ion selected from the group consisting of alkali metals, alkaline earth metals and combinations thereof, preferably selected from the group consisting of sodium, potassium, calcium, strontium, magnesium and combinations thereof.

Hydroscopic salts that are particularly preferred for the present invention are high energy storage density hygroscopic salts that have a theoretical storage density higher or equal than 1 $GJ/m^3$.

The storage density of a hydroscopic salt in an energy device can be empirically determined or theoretically be calculated by the change in enthalpy of the (de)hydration reaction from the lowest hydration state (as considered for the energy device) to the highest hydration state (considered for the energy device), multiplied by the theoretic maximum density of the material in the highest hydrated state (as considered for the energy device). For the sake of simplicity, the volume taken by the water in the dehydrated state is generally left out of the calculation. Thermodynamic data such as enthalpy values of salts can be found in literature (see for instance P. A. J. Donkers et al., Applied Energy 199 (2017) 45-68 or De Boer, *Thermochimica Acta*, 2002) or empirically be determined.

For example, the energy storage density of sodium sulfide ($Na_2S$) is 2.9 $GJ/m^3$ as calculated from the following equations:

$$E_{th} = \Delta H(Na_2S \cdot 5H_2O(s) \leftrightarrow Na_2S \cdot 0.5H_2O(s) + 4.5H_2O(g)) \times$$
$$TMD(Na_2S \cdot 5H_2O(s))$$

$$E_{th} = 1833 \frac{kJ}{kg} * 1.58 \frac{kg}{m^3} = 2.9 \, GJ/m^3$$

wherein $\Delta H$ is the change in enthalpy of the (de)hydration reaction and TMD is the theoretical maximum density of the hygroscopic salt.

For the present invention, hygroscopic salts having a energy storage density of more than 0.5 $GJ/m^3$, preferably more than 1 $GJ/m^3$, more preferably more than 2 GJ/m, most preferably more than 2.5 $GJ/m^3$ are preferred.

Suitable hygroscopic salts that can be used in accordance with the present invention are metal halides, in particular metal chlorides, fluorides bromides, or iodides, such as AgF, $AuCl_3$, LiCl, $CaCl_2$, $CrCl_2$, $CuCl_2$, $FeCl_2$, $FeCl_3$, $MgCl_2$, $NiCl_2$, $SrCl_2$, $EuCl_3$, $GdCl_3$, $LaCl_3$, $AlF_3$, CsF, RbF, $CaBr_2$, LiBr, $MgBr_2$, $SrBr_2$, LiI, $MnI_2$; phosphates, in particular $CaHPO_4$, $Ca(H_2PO_4)_2$, $K_3PO_4$, $Na_3PO_4$, $Mg_3(PO_4)_2$, $Na_2HPO_4$; pyrophosphates, such as $K_4P_2O_7$, $Na_4P_2O_7$; sulfates, such as $CuSO_4$, $VOSO_4$, $Al_2(SO_4)_3$, $FeSO_4$, $KAl(SO_4)_2$, $Li_2SO_4$, $MgSO_4$, $MnSO_4$; $Na_2SO_4$; $NaHSO_4$;

sulfites, such as $Na_2SO_3$; sulfides, such as $Na_2S$; cyanides such as $K_4Fe(CN)_6$; nitrates such as $LiNO_2$, $Mg(NO_3)_2$; carbonates, such as $K_2CO_3$; thiosulfates, such as $Na_2S_2O_3$; silicates, such as $Na_2SiO_3$. Instead of hygroscopic salts based on metal cations, certain salts comprising an ammonium cation can be used as well, such as $NH_4Al(SO_4)_2$ (ammonium alum). The hygroscopic salt preferably comprises one or more salts from the group consisting of $LiCl$, $CrCl_2$, $CuCl_2$, $CaCl_2$, $FeCl_2$, $LaCl_3$, $MgCl_2$, $EuCl_3$, $GdCl_3$, $LiBr$, $CsF$, $LiI$, $MnI_2$, $LiNO_2$, $Mg(NO_3)_2$, $Al_2(SO_4)_3$, $KAl(SO_4)_2$, $VOSO_4$, $Na_3PO_4$, $K_2CO_3$, $Na_2CO_3$, $Na_2S$, most preferable the hygroscopic salt comprises $Na_2S$.

For clarity and conciseness, it is noted that all possible hydration states of salt that the hygroscopic salts are meant to be included in the respective hydroscopic salts, as long as the hygroscopic properties of the salts is not compromised. For instance, for $Na_2S$ the hydration states 0, 2, 5 and 9 are included. With hydration state is meant the number of water molecules per formula unit of the salt.

The presence of the base in the salt composition is believed to shift the equilibrium of the undesired gas forming reaction (e.g. that according to reaction VI) back to the formation of the acid (typically water) and the hygroscopic salt. Preferably, the base comprises a basic salt that comprises a metal ion which is the same as the metal ion that may be present in the hygroscopic salt. When the base and the hygroscopic salt are based on a common metal ion, the risk of undesired side reactions, such as an exchange of metal ions between the hygroscopic salt and the base is limited. In a particularly preferred embodiment, the hygroscopic salt and the base both comprise sodium. For instance, the hygroscopic salt may comprise $Na_2S$ whilst the base may comprise NaOH.

Generally, the base comprises a metal ion selected from the group consisting of alkali metals, alkaline earth metals and combinations thereof, preferably selected from the group consisting of sodium, potassium, calcium, strontium, magnesium and combinations thereof.

In the embodiments wherein the base comprises a basic salt, said basic salt typically comprises an anion selected from the group consisting of hydroxide, carbonate, bicarbonate acetate, sulfide, silicate, preferably hydroxide. Typical examples of suitable bases include NaOH, KOH and the like.

In a particular embodiment, the base is a basic salt that may readily be blended with the hygroscopic salt to prepare that salt composition. For instance, the hygroscopic salt and the base, preferably the basic salt may both be provided as a powder and blended as such, e.g. by grinding.

In a particularly preferred embodiment, the base and the hygroscopic salt are blended on a molecular scale. This provides a homogeneous distribution of the base within the salt composition and typically results in a particularly effective reduction of the undesired gas formation. This particularly preferred salt composition may be obtainable by co-crystallization of the hygroscopic salt and the base. However, co-crystallization may only be possible for certain salt composition since the hygroscopic salt may also tend to separately crystallize from the base, resulting in crystals comprising only the base or the hygroscopic salt.

The blend on a molecular scale of the hygroscopic salt and the base may also be obtained by providing a solution (e.g. an aqueous solution) of the base and blending the solution with a powder comprising the hygroscopic salt, followed by drying the blend to obtain a dried blend of the base and the hygroscopic salt. It may also be possible to provide a solution of the hygroscopic salt and to blend this solution with a powder comprising the base. In yet another embodiment, said blend of the salt composition on a molecular scale may be obtainable by blending the solution comprising the base with the solution comprising the hygroscopic salt and subsequently drying said blend of solutions.

Said particularly preferred salt composition comprising a blend of the hygroscopic salt and the base on a molecular scale may also be obtainable by providing a melt comprising the hygroscopic salt and the base, followed by solidifying said melt. The salt composition obtainable by providing the melt followed by solidifying the melt is preferred.

Typically, the salt composition comprises the hygroscopic salt and the base in a ratio of less than 1:1, preferably in a ratio of less than 2:1. The ratio is preferably more than 100:1 and most preferably between 5:1 and 25:1, for instance about 10:1 or less.

For sake of clarity it is noted that the hydroscopic salt and the base in accordance with the present invention are two different chemical entities, meaning that the salt composition of the present invention is not a single salt that can function both as the hygroscopic salt and as the base.

The salt composition is preferably present in a porous or "open" configuration in order to allow sufficient water vapor transport towards the hygroscopic salt. The porous configuration can exist in various ways, examples are: granules or tablets, foam-like, powder, etc. Preferably, the salt composition is in a porous configuration having a porosity in the range of 10 to 50%, more preferably in the range of 20 to 40%, wherein the porosity is expressed as the fraction of the volume of voids (i.e. including macro and micro porosity voids) over the total volume of the porous configuration.

The salt composition may comprise one or more additives for mechanical stabilization, thermal conductivity enhancement and/or facilitating the shaping the salt composition in the desired form (e.g. porosity) and the like. Examples of mechanical stabilization additives included for instance a polymer matrix, a polymer coating (both may e.g. be based on cellulose or ethyl cellulose) and/or clays (e.g. sepiolite, laponite). Examples of thermal conductivity enhancers include carbon-based materials (e.g. graphite, carbon nanofibers), metals (e.g. powders, coatings) and the like. Examples of additives that help to obtain the salt composition in the required shape or form include for instance granulating agents (e.g. stearates, aerosils, talc, clays and others), blowing agents (e.g. baking powder and others) and lubricants. These additives may be used to enhance the performance of the system.

A further aspect of the present invention relates to a thermochemical energy device, in particular an energy storage device, comprising the salt composition as described herein. FIG. 1 schematically illustrates a particular embodiment of the thermochemical energy storage device in accordance with the present invention. The thermochemical energy storage device comprises the salt composition (2) that is typically located in an energy storage compartment (1). The energy storage compartment generally further comprises a heat exchanger (3) that is thermally connected to the salt composition such that the salt composition can receive from and/or release heat to the exterior of the energy storage compartment.

The thermochemical energy device typically further comprises a liquid (e.g. water) storage compartment (4) comprising a condenser (6) such that liquid vapor (e.g. water vapor) (5) that is released from the salt composition can be condensed and collected. When the device is discharged, the condenser (6) may function as an evaporator unit to evaporate the condensed liquid e.g. water). The liquid storage compartment may also comprise an evaporator unit separate from the condenser.

During operation, the thermochemical energy device typically operates under reduced pressure, preferably vacuum (except from the partial water vapor pressure). For discharging the device, water may flow from the water storage compartment (4) towards the salt composition such that heat can be generated. The flow rate can be controlled by a restricted gas flow passage which is preferably closable by a valve (7).

The salt composition of the present invention gives particularly good results for the thermochemical energy device comprising said restricted gas flow passage. Without wishing to be bound by theory, it is believed that due to the restricted gas flow passage, the released water traveling from the energy storage compartment to the water storage compartment reaches a high velocity and thereby may carry more or more effectively the gas to the water storage compartment resulting in more gas production and more accumulation of the gas in the water storage compartment. As such, the reduced performance of thermochemical energy device is particularly pronounced by thermochemical energy devices comprising the restricted gas flow passage. Limiting the gas production by shifting the equilibrium away from the gas production by the presence of the base is therefore particularly advantageous for such devices.

Figure 2:
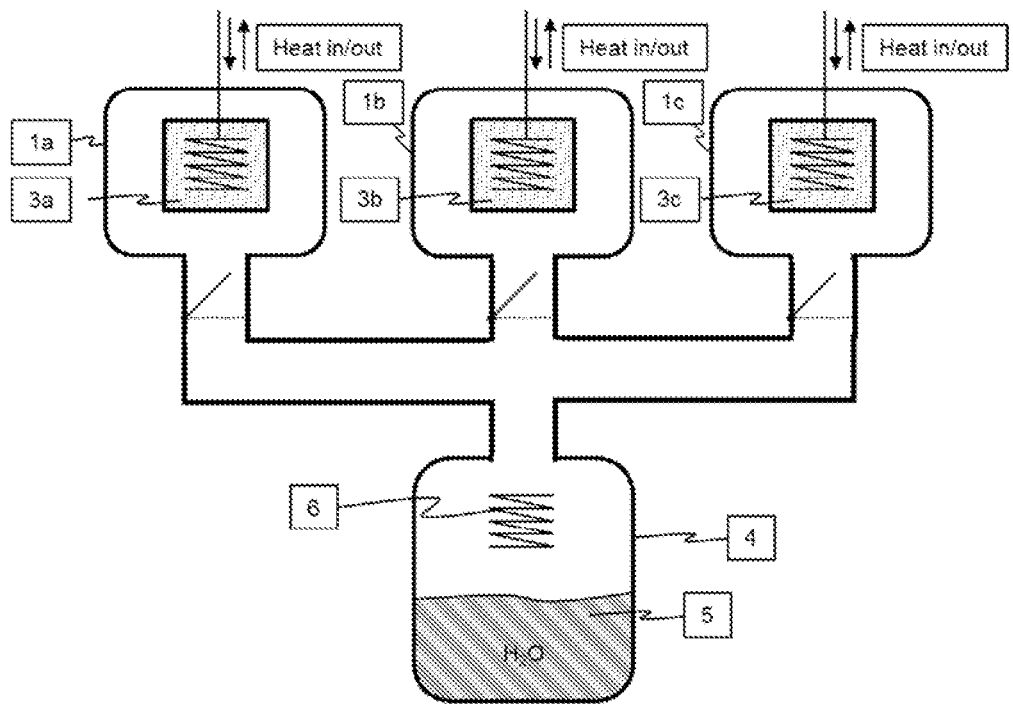
FIG. 2 schematically illustrates a particular embodiment of a thermochemical energy device comprising a plurality of energy storage compartments in accordance with the present invention.

In a particular embodiment, the thermochemical energy device a plurality (e.g. two or more) of energy storage compartments (1a, 1b, 1c) may be connected to the water storage compartment. FIG. 2 schematically illustrates a particular embodiment in accordance with the present invention. Each energy storage compartment (1a, 1b, 1c) may comprise a salt composition (3a, 3b, 3c) in accordance with the present invention.

A further aspect of the present invention is the energy storage compartment comprising the salt composition. This energy storage compartment may be part of the thermochemical energy device as described herein, or may be separated from the device such that for instance it may installed within a modular design of the thermochemical energy storage device.

For the purpose of clarity and a concise description features are described herein as part of the same or separate embodiments, however, it will be appreciated that the scope of the invention may include embodiments having combinations of all or some of the features described.

The project leading to this application has received funding from the European Unions' Horizon 2020 research and innovation programme under grant agreement No 680450.

The invention may be illustrated with the following examples.

Example 1

A desorption experiment was performed with the hygroscopic salt $Na_2S \cdot 5H_2O$ as follows.

The wet hygroscopic salt $Na_2S \cdot 5H_2O$ (92.1% pure) was introduced in a salt container of a setup that further comprised an empty water collection reservoir. The temperature of the salt container and the water reservoir could independently be controlled.

The $Na_2S \cdot 5H_2O$ was dried as follows. The system was evacuated by a vacuum pump. During 24 hours, the temperature of the salt container was maintained at about 80° C. and the temperature of the water collection reservoir was cooled to about 10° C.

After 24 hours, the amount of collected water in the water reservoir was determined indicating the amount of desorbed water from the hydroscopic salt $Na_2S \cdot 5H_2O$. A desorption of 63% was obtained.

Example 2

A desorption experiment was performed with a recrystallized hygroscopic salt $Na_2S \cdot 5H_2O$ by following a similar procedure as described in Example 1. A desorption of 75% was obtained (Table 1, entry 2).

Example 3

A salt composition comprising $Na_2S \cdot 5H_2O$ (92.1% pure) and 10 wt. % NaOH was prepared by blending and grinding both salts in a mortar.

A desorption experiment was performed with the salt composition by following a similar procedure as described in Example 1. A desorption of 85% was obtained.

Example 4

A salt composition comprising $Na_2S \cdot 5H_2O$ (92.1% pure) and 10 wt. % NaOH was prepared by providing a blend of solid $Na_2S \cdot 5H_2O$ (92.1% pure) with 10 wt. % solid NaOH, and heated the blend to 90° C. until the $Na_2S \cdot 5H_2O$ was molten. The melt was then cooled to room temperature on a metal surface to provide the salt composition.

A desorption experiment was performed with the salt composition by following a similar procedure as described in Example 1. A desorption of near 100% was obtained.

Example 5

A salt composition comprising $Na_2S \cdot 5H_2O$ (92.1% pure) and 10 wt. % NaOH was prepared by mixing solid $Na_2S \cdot 5H_2O$ (92.1% pure) with 10 wt. NaOH in an aqueous solution (56 wt. % NaOH in water), followed by drying the mixture at 45° C.

A desorption experiment was performed with the salt composition by following a similar procedure as described in Example 1. A desorption of 83% was obtained.

What is claimed is:

1. A thermochemical energy device comprising a salt composition, said salt composition comprising a base and a hygroscopic salt, wherein the base comprises NaOH and wherein the hygroscopic salt comprises $Na_2S$, wherein the salt composition is present in a porous configuration.

2. The thermochemical energy device of claim 1, wherein the salt composition is obtainable by providing a melt comprising the hygroscopic salt and the base, followed by solidifying said melt.

3. The thermochemical energy device of claim 1, wherein the hygroscopic salt has a theoretical energy storage density of more than 0.5 $GJ/m^3$.

4. The thermochemical energy device of claim 3, wherein the theoretical energy storage density of the hygroscopic salt is more than 2.5 $GJ/m^3$.

5. The thermochemical energy device of claim 1, further comprising an energy storage compartment.

6. The thermochemical energy device according to claim 5, further comprising a liquid storage compartment comprising a condenser and/or evaporator unit and a heat exchanger, wherein the energy storage compartment comprises the salt composition and the heat exchanger is thermally connected to the salt composition.

7. The thermochemical energy device according to claim 6, further comprising a restricted gas flow passage, closable by a valve, between the liquid storage compartment and the energy storage compartment.

8. The thermochemical energy device of claim 1, wherein the porous configuration of the salt composition has a porosity from 10 to 50%, expressed as a fraction of a volume of voids over a total volume of the porous configuration.

9. The thermochemical energy device of claim 8, wherein the porosity of the salt composition is from 20 to 40%.

10. The thermochemical energy device of claim 1, wherein the hygroscopic salt and the base are present in a weight ratio of less than 2:1.

11. The thermochemical energy device of claim 10, wherein the weight ratio of the hygroscopic salt and the base is less than 5:1.

12. The thermochemical energy device of claim 11, wherein the weight ratio of the hygroscopic salt and the base is from 5:1 to 25:1.

* * * * *